(No Model.)
T. T. MAYES.
HAY PRESS.
No. 418,735. Patented Jan. 7, 1890.
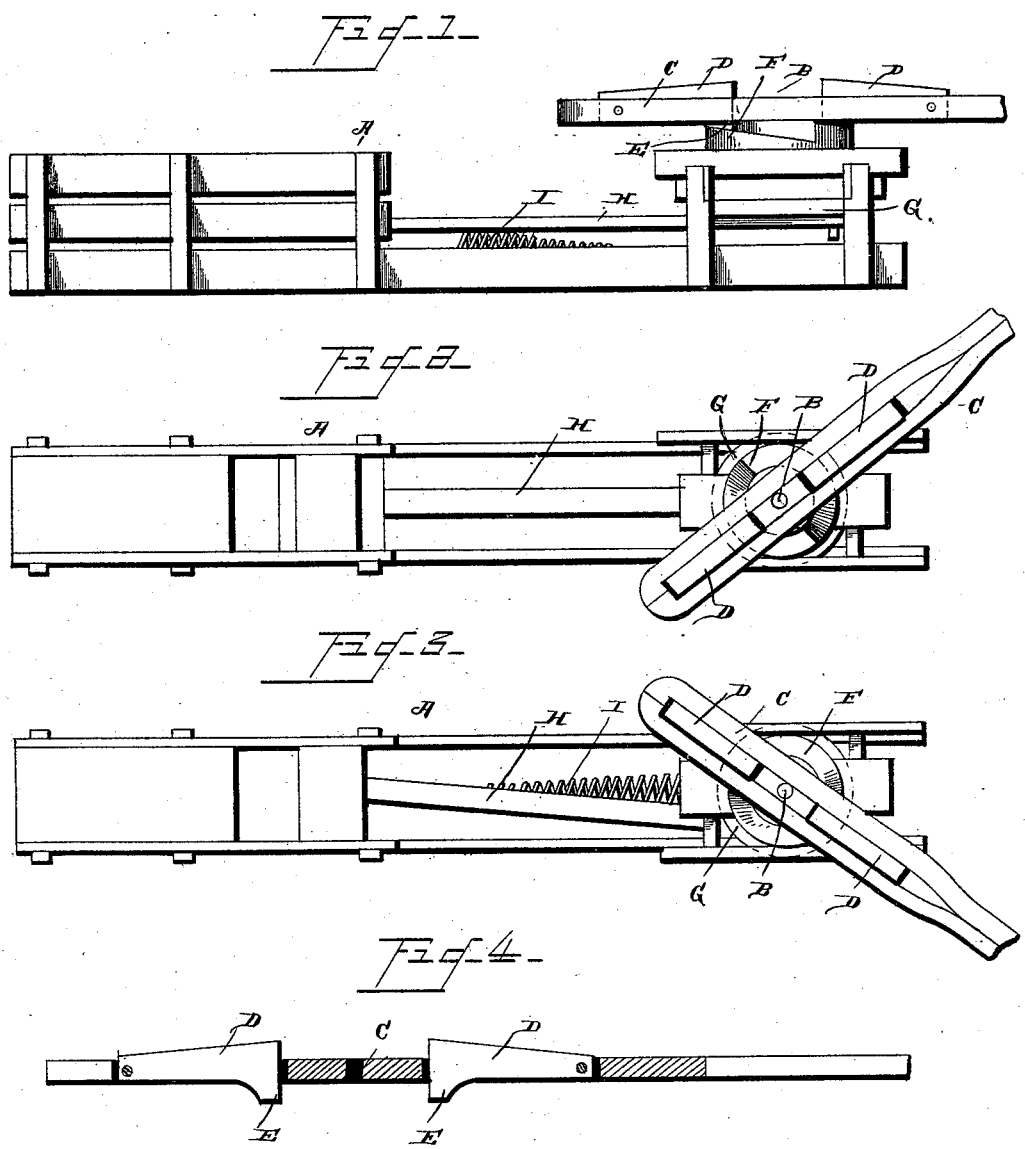
Witnesses
Geo. E. Frech.
R. H. Bishop.
Inventor
Thomas T. Mayes.
By his Attorneys
C. A. Snow & Co.

UNITED STATES PATENT OFFICE.

THOMAS T. MAYES, OF BELTON, TEXAS.

HAY-PRESS.

SPECIFICATION forming part of Letters Patent No. 418,735, dated January 7, 1890.

Application filed October 31, 1889. Serial No. 328,753. (No model.)

*To all whom it may concern:*

Be it known that I, THOMAS T. MAYES, a citizen of the United States, residing at Belton, in the county of Bell and State of Texas, have invented a new and useful Hay-Press, of which the following is a specification.

My invention relates to improvements in hay-presses; and it consists in certain novel features hereinafter described and claimed.

In the drawings, Figure 1 is a side view of my improved press. Figs. 2 and 3 are plan views illustrating the operation of the press. Fig. 4 is a detail section of the sweep.

The supporting-frame A of my improved press may be constructed in any desired manner, and in one end of the frame I erect the pivot-pin or king-bolt B, to the upper end of which the sweep C is loosely secured. This sweep is shown as being composed of two bars or branches, and between the said bars or branches I pivot the dogs D D, which are provided at their free ends on their under sides with the lugs or enlargements E, which are adapted to rest on the upper side of the double cam F, secured on the pivot-pin below the sweep. To the lower end of the pivot-pin I secure a crank-disk G, to which I pivot the outer end of the pitman H, said pitman being connected to the plunger in the usual manner. A retractile spring I is secured to the pitman and the frame, so as to aid in the rebound of the plunger.

In operation the hay is fed into the press in the usual manner, and the sweep is then continuously rotated, so as to impart a rotary motion to the pivot-pin by reason of the dogs carried thereby coming in contact with the shoulders of the double cam, and thereby setting the same in motion. The pitman will thus be reciprocated and the plunger caused to act on the hay so as to compress the same. As the pitman passes the dead-center, the rebound of the hay, accelerated by the contraction of the retractile spring, will cause the pitman to return to its initial position, thereby carrying the double cam under the dogs, so that the shoulders will be brought into engagement with the dogs and the pitman thus reciprocated by a continuous rotary motion of the sweep, and two charges will be pressed during each rotation of the sweep.

It will be observed from the foregoing description that I have provided a hay-press which can be rapidly and easily operated, in which the several parts are compactly arranged, and which will be strong and durable.

Having thus described my invention, what I claim is—

The combination, with the frame, of the pivot-pin mounted in the end of the frame and having a crank-disk on its lower end, the pitman pivoted to said disk, the spring secured to the pitman and the frame, the double cam secured on the pivot-pin, the sweep loosely mounted on the pivot-pin above the said double cam, and the dogs pivoted within the sweep and bearing on the cam, as set forth.

In testimony that I claim the foregoing as my own I have hereto affixed my signature in presence of two witnesses.

THOMAS T. MAYES.

Witnesses:
CHARLEY DEMOORE,
F. P. MAYES.